United States Patent [19]

Kingsley et al.

[11] Patent Number: 4,758,040
[45] Date of Patent: Jul. 19, 1988

[54] EXTERIOR VISOR FOR AUTOMOTIVE VEHICLES

[75] Inventors: Richard J. Kingsley, Vancouver, Wash.; Michael C. Kingsley, 9601 Onyx Dr., Tacoma, Wash. 98499

[73] Assignee: Michael C. Kingsley, Tacoma, Wash.

[21] Appl. No.: 849,012

[22] Filed: Apr. 7, 1986

[51] Int. Cl.⁴ .............................................. B60J 3/00
[52] U.S. Cl. ............................ 296/97 A; 296/95 R; 403/337
[58] Field of Search ............... 295/95 R, 95 Q, 97 A; 403/337, 335; 49/62

[56] References Cited

U.S. PATENT DOCUMENTS

| | | | |
|---|---|---|---|
| 4,270,748 | 6/1981 | Ray | 403/337 |
| 4,412,698 | 11/1983 | Kingsley | 296/97 A |
| 4,652,038 | 3/1987 | Aunger | 296/97 A |

Primary Examiner—Robert R. Song
Attorney, Agent, or Firm—Hughes, Cassidy & Multer

[57] ABSTRACT

An exterior visor (20') for automotive vehicles (21) formed of two or more symmetrical visor sections (20a, 20b) adapted to be abutted in end-to-end relation to form an exterior visor (20') having an overall length "L" in the range of from about 55" to about 70", or more, wherein each visor section (20a, 20b) is provided with an integral, downwardly projecting, fore/aft vertical flange (32,34) adapted to be sandwiched between complementally shaped reinforcing plates (35, 36) and permanently secured together by rivets (38) with the thus assembled flanges (32, 34) and plates (35, 36) defining an integral reinforcing support or brace for the visor (20') and wherein, when disassembled, the visor sections (20a, 20b) may be stacked in nested relation and packaged in a box (31) having a length "L", a height "H" and a depth "D" wherein the dimensions "L", "H" and "D" are such that "L"+2 ("H"+"D") is equal to or less than 84" even where the overall length of the assembled visor (20') may be on the order of 70", or more.

18 Claims, 3 Drawing Sheets

EXTERIOR VISOR FOR AUTOMOTIVE VEHICLES

BACKGROUND OF THE INVENTION

1. Technical Field

The present invention relates generally to exterior visors for automotive vehicles; and, more particularly, to an improved visor construction formed of two or more visor sections adapted to be rigidly secured together when placed in end-to-end relation and which may be formed of any conventional material such, merely by way of example, as: synthetic plastic materials vacuum molded or otherwise formed into the desired shape; fiberglass; chromium plated synthetic plastic materials or fiberglass; or metal. Moreover, exterior visors embodying the features of the present invention may be of the conventional "flush-mounted" type or the conventional "flow-through" type; and, further, they may be formed with or without one or more air scoops, transverse louvers and/or other types of both functional and aesthetically pleasing decorative features which typify existing visor constructions available in the marketplace today.

2. Background Art

Historically, exterior sun or rain visors for automotive vehicles trace their origins to the general period of the 1940s at a time when there was a functional demand for such products since tinted glass was not then available for use or, at least, was not commonly used, with automotive vehicle windows. Such visors were, therefore, commonly used to provide a functional advantage, preferably, but not exclusively, in shielding the vehicle's occupants from the sun's glare; and, at the outset, a pleasant aesthetic appearance, while desirable, was not an essential characteristic of such products and, for the most part, was not typical of the visor products then available.

By the 1950s, however, tinted glass became commonly available and was regularly used for automotive vehicle windows; and, as a consequence, the functional need for such exterior vehicle visors was significantly decreased. This fact, coupled with the fact that such visors as were then available did not present a pleasing aesthetic appearance and were obviously "add on" accessories rather than factory installed equipment caused lack of commercial acceptance and consequent non-use of such products.

During the latter 1960s and continuing into the 1970s, however, demand for exterior visors again increased. Many factors undoubtedly contributed to such increased demand including, for exmaple: (i) the progressively more streamlined aerodynamic design of automotive vehicles resulting in windshields which flared backwardly at acute included angles with the horizontal; (ii) increased usage of automobiles and greater exposure of the vehicle's occupants to undesired glare conditions; (iii) improved availability of inexpensive, strong and lightweight materials; and (iv), improved manufacturing technologies which enabled accessory manufacturers to make products that were not only pleasing in appearance from an aesthetic standpoint, but, which also appeared to be of the factory installed type rather than presenting the impression of being "add on" equipment.

Simultaneous with the increased demand for exterior visors, automotive manufacturers began to augment their product lines with wide varieties of differing vehicle models—e.g., coupes, sedans, station wagons, pickup trucks, etc., each in multiple brand-name versions—and, shortly thereafter, consumers found that they could not only select from a wide range of vehicles manufactured by any given domestic manufacturer, but, additionally, they found that the number of manufacturing sources had grown significantly due to the importation of similar wide ranges of vehicle models from many foreign manufacturers.

As those skilled in the art will appreciate, the construction of vehicle windshields, roof lines and body frames varies widely from manufacturer to manufacturer and from model to model for any given manufacturer; and, for the most part, the configurations employed are unique to each different vehicle model made by each different manufacturer. In short, manufcturers of exterior visors for automotive vehicles were quickly faced with the need to offer their visors in thirty (30), forty (40), or more shapes and sizes which are compatible with the particular vehicle on which the visors are to be used. This created a problem not only for the visor manufacturer, but, also for the automotive parts distributors and retailers who are called upon to order and stock meaningful quantities of many different visor models. To make matters worse, each visor was, and still is, separately packaged in a box that commonly ranges from about 55" in length to about 70" in length, or more, and on the order of up to 40", or more, in girth—viz., twice the sum of heighth plus depth. Thus, each boxed visor commonly occupies anywhere from 2.5 to 3.5 cubic feet of storage space, or more; and, consequently, for a given merchant to stock ten visors each for forty different automotive vehicle models often requires dedication of warehouse space in excess of 1200 cubic feet or more.

A further problem faced by visor manufacturers, suppliers and users is the fact that the very nature of an exterior visor and the environment in which it is used—e.g., high wind conditions, high speeds, etc.—requires that the visor have sufficient inherent resiliency so as to prevent damage to the vehicle body structure on which the visor is mounted. Thus, a typical commercially available visor used during the 1970s and 1980s prior to the advent of the present invention will be subjected to significant front edge "flutter"—often a movement of from $\frac{1}{8}$" to as much as $\frac{7}{8}$" depending upon the materials from which the visor is made, the configuration of the visor and the vehicle's body structure in the region of visor attachment, and the wind conditions to which the visor is subjected. Efforts to reduce this degree of resiliency and front edge visor "flutter" by, for example, making the visor of rigid non-resilient materials or of relatively thick materials have proven counterproductive for many reasons. For example, the cost of materials and of manufacturing becomes prohibitively high with steel and thickened plastic materials, as does the cost of shipment of the product from the manufacturing source to the distributor/warehouser and on to the retailer. Moreover, as the visors become more rigid, greater and greater energy forces are transmitted to the vehicle's support structure, often resulting in buckling of the vehicle roof or body.

Yet another significant problem faced by manufacturers, suppliers and users of exterior automotive vehicle visors has been the inherent incompatibility of such products with bug deflectors of the type in common use today, particularly in those geographic regions where bugs present a severe problem for drivers. Thus, bug deflectors are, in general, designed to create a generally horizontally oriented cyclonic vortex of moving air which entrains bugs, small stones and other foreign objects and which moves upwardly over the vehicle windshield with the bugs and other objects being ejected from the cyclonic vortex at its opposite extremities. This cyclonic vortex generates tremendous forces which tend to tear exterior automotive visors from their mountings, thus destroying the visor and, often, damaging the vehicle body structure at those points where the visor is mounted. As a consequence, visor manufacturers have, for the most part, been required to warn consumers that their visors are not to be used on vehicles having bug deflectors; and, this has, for all practical purposes, foreclosed most visor manufacturers from supplying visors to consumers in certain geographic regions where bug deflectors are commonplace. Indeed, the problem has created severe warranty problems for visor manufacturers since they cannot readily ascertain and/or prove that a damaged visor returned under warranty has been damaged because the user had a bug deflector. It should, however, be noted that it is technically possible to provide heavier and thicker visors which are capable of use with bug deflectors; but, as previously indicated, such visors are extremely costly in terms of manufacture and shipping costs; and, further, subject the vehicle support structure to undesirable fatigue problems.

Yet another problem inherent with exterior automotive vehicle visors that has plagued the industry is related to that significant segment of the consuming public who demand chrome accessories for use with their vehicles. The technology for chrome plating synthetic plastic and/or fiberglass products and the like is well known; but, plating facilities capable of handling and chrome plating products ranging up to 70" or more in length and on the order of 40" or more in girth are very few in number and generally located only in close proximity to automobile manufcturers who have a continuing need for such facilities. Therefore, visor manufacturers who are geographically remote from such facilities are simply unable to meet the demand of this particular market segment unless they are willing to ship their product cross country from the point of manufacture to a chrome plating facility and back, a prohibitively costly procedure.

Finally, conventional exterior visors for automotive vehicles create a significant cost problem in "special order" situations. Thus, in those instances where a visor manufacturer is located at a remote point from the market he wishes to serve—for example, the visor manufacturer may be on the West coast and wish to serve the market on the East coast—it is necessary that the manufacturer provide or obtain a distribution system which is capable of storing a sufficient quantity of the manufacturer's visor product line—which, as previously indicated, often includes up to forty or more different visor models—to meet anticipated market requirements. Occasionally the distributor and/or retainer will run out of a particular model that is needed by a given customer who will then request that the supplier "special order" his product from the manufacturer. Shipment of single products by commercial carrier can be, at best, an expensive project. Given the nature and size of the products involved, the most expedient type of shipment of single products is via United Parcel Service (UPS) or similar common carrier. A conventional exterior visor when packaged may weigh, for example, on the order of only about 4 pounds; but, as previously indicated, it will have a girth of up to on the order of 40" or more and a length of from about 55" to about 70", or more. United Parcel Service regulations provide that any package, regardless of its relatively low weight, must be shipped at the rate for a twenty-five pound package if its length plus its girth exceeds 84". In short, this means that the shipping costs to fill a "special order" demand for a single out-of-stock visor will be increased from on the order of $3.60 for shipment of a four pound package from coast to coast to more than $13.00, the rate charged for a twenty-five pound package. Neither the manufacturer nor the dealer can or will absorb this significant shipping charge; and, while the customer might be willing to absorb a $3.60 shipping charge, he will normally be unwilling to agree to absorb charges on the order of four times that amount.

As previously stated, conventional exterior visors for automotive vehicles fall within a wide range of differing constructions and designs. For example, U.S. Pat. No. 2,777,732—Walsh is typical of a conventional "flush-mounted" exterior visor construction wherein the visor comprises a single piece of material that spans the vehicle's width and is secured to the vehicle roof in a "flush-mounted" condition. Australian Patent No. 229,957 and U.S. Pat. Nos. 2,566,934—Dieterich, 2,673,117—Krusemark, 4,320,919—Butler and Des. 261,500—Butler, on the other hand, typify conventionally available visors of the "flow-through" variety wherein the trailing edge of the visor is spaced from the vehicle body structure so as to permit air to flow therethrough and eliminate pressure buildups.

Yet another type of commercially successful exterior automotive vehicle visor is that disclosed in U.S. Pat. Nos. Des. 252,680—Kingsley et al, and 4,412,698—Kingsley. Thus, in this construction the visor includes a centrally located, rearwardly opening scoop which flares upwardly, outwardly and rearwardly from the leading edge of the visor. Such scoop serves to impart structural rigidity to the visor thus tending to minimize front edge "flutter", while, at the same time, permitting air to flow-through the scoop and thereby minimizing pressure buildups under the visor.

All of the foregoing known prior constructions are, however, typified by the inclusion of a single visor element which spans the width of the vehicle—i.e., which commonly ranges from 55" to 70", or more, in width. All are normally devoid of a central support or bracket except to the extent that the scoop in the aforesaid Kingsley patented constructions provides a modicum of additional strength. And, because of their size, each of the conventional visors is subject to all of the problems discussed above.

SUMMARY OF THE INVENTION

The present invention overcomes all of the foregoing disadvantages by providing a simple, yet surprisingly effective, exterior visor for automotive vehicles which, in the exemplary form of the invention shown and herein described, comprises a pair of symmetrical visor sections adapted to be placed in end-to-end abutting relationship and secured together. The visor sections are each provided with mating fore/aft vertical flanges adjacent their abutting inboard edges which, when secured together in face-to-face relation, define an integral rigid brace or support which is not easily visible from the exterior of the vehicle and does not, therefore, detract from the pleasing aesthetic appearance of the visor. At the same time, the abutting and rigidly secured flanges serve to significantly increase the rigidity of the visor, minimizing front end "flutter" even when used in conjunction with a bug deflector. The construction readily permits "flush-mounting" of the visor while at the same time providing pressure relief in the form of one or more air scoops and/or louvers. Because the visors are made in two sections, they are effectively half the length of a conventional one-piece visor. Thus, the two sections can be readily nested together and, when packaged for shipment, the length plus girth measurement of the package will generally be significantly less than 84", thereby permitting the package to be shipped at its true weight rather than an arbitrary twenty-five pound weight; and, of course, since the packaged product is effectively only half the length of a conventional visor intended to serve the same purpose, the same number of visors can be stored in only half the space as required by conventional one-piece visors. Finally, chrome plating facilities capable of handling products having a length up to about 36" and a girth of about 40" are commonly located in virtually any given geographic region, thereby enabling visor manufacturers to economically chrome plate their visors irrespective of their physical geographic manufacturing location.

DESCRIPTION OF THE DRAWINGS

These and other objects and advantages of the present invention will become more readily apparent upon reading the following detailed description and upon reference to the attached drawings, in which.

Figure 1:
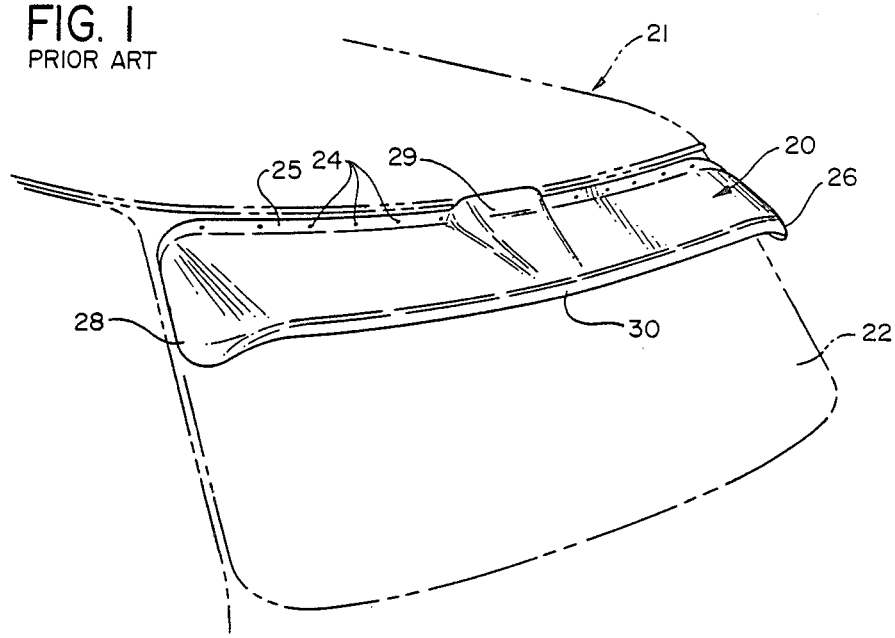
FIG. 1 is a perspective view of conventional prior one-piece exterior automotive vehicle visor, here showing the visor in solid lines mounted on the vehicle body structure shown in phantom lines and spanning the width of the vehicle above the windshield.

While the invention is susceptible of various modifications and alternative forms, a specific embodiment thereof has been shown by way of example in the drawings and will herein be described in detail. It should be understood, however, that it is not intended to limit the invention to the particular form disclosed but, on the contrary, the intention is to cover all modifications, equivalents and alternatives falling within the spirit and scope of the invention as expressed in the appended claims.

DETAILED DESCRIPTION

Figure 2:
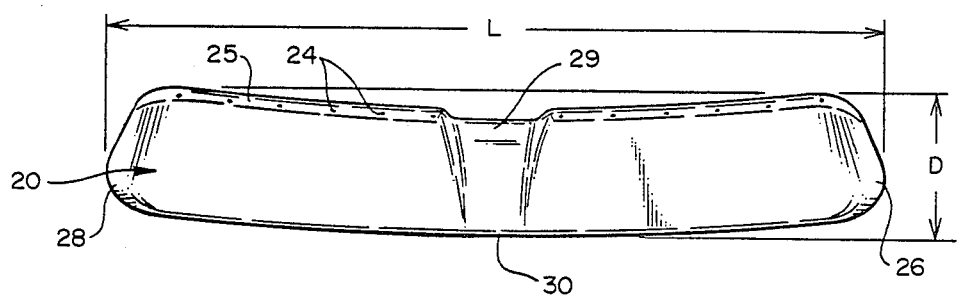
FIG. 2 is a plan view of the conventional visor shown in FIG. 1.
Figure 3:
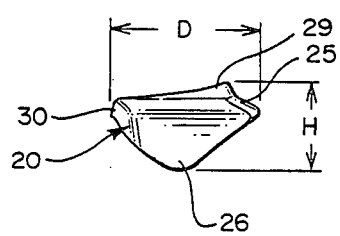
FIG. 3 is an end view of the conventional visor shown in FIGS. 1 and 2.

Turning now to the drawings, and focusing attention first on FIGS. 1 through 3, there has been illustrated a conventional commercially available visor, generally indicated at 20 in solid lines, of the type illustrated in the aforesaid Kingsley et al U.S. Pat. No. Des. 252,680 and Kingsley U.S. Pat. No. 4,412,698. Thus, as here shown, the visor 20 is formed of a single piece of material which spans the width of the vehicle, generally indicated in phantom at 21, and is secured to the vehicle body structure in a flush-mounted arrangement at the juncture of the roof line and the upper transverse edge of the windshield, here depicted in phantom at 22.

To secure the visor 20 to the vehicle 21, a plurality of "pop" rivets 24 are employed. Thus, as here shown, the exemplary conventional visor 20 is provided with a slightly curved configuration conforming to the shape of the vehicle support structure and is further provided with an upwardly flared trailing edge 25 through which the rivets pass. Those skilled in the art will appreciate that the curvature of the trailing edge of the visor and the angle of the flared edge portion 25 will vary widely from visor to visor dependent upon the configuration of the particular vehicle for which the visor is designed. Stated differently, it will be understood that visors of the type here under consideration will be "custom made" for each different vehicle with which the visors are to be employed. The opposite extremities 26, 28 of the exemplary visor 20 are preferably turned down out of the visor plane so as to conform to the configuration of the wrap-around structure of windshield 22.

In order to relieve pressure buildup beneath the visor 20, it is preferably provided with a centrally located, rearwardly opening air scoop 29 which flares upwardly, outwardly and rearwardly from the leading edge 30 of the visor, preferably adjacent the midpoint thereof. Although not illustrated in the drawings, the visor 20 may be provided with multiple scoops 29 or, alternatively, it may include louvers instead of, or in conjunction with, the air scoop(s) 29.

Referring to FIGSS. 2 and 3 conjointly, it will be noted that the conventional visor 20 has an overall length "L" (which typically varies from about 55" to about 70"); a heighth "H" which is commonly on the order of about 5" to about 7", although for certain vehicle models it may be more or less; and, a depth "D" which is commonly on the order of from about 11" to about 14", although again the dimension may vary significantly dependent upon the actual configuration of the vehicle for which the visor is designed. Those skilled in the art will appreciate that the term "girth" as used herein and by conventional common carriers such as UPS means twice the sum of the heighth "H" plus the depth "D"—viz., 2 ("H"+"D"). The box necessary to ship a visor of the type shown in FIGS. 1-3, while not shown in these particular figures, would be similar to, but longer than, the box 31 depicted in FIG. 9; and, the outside dimensions of such a box as is required to package one of the smallest commercially available one-piece visors such as that indicated at 20 in FIGS. 1-3 has a length "L" of 55", a heighth "H" of 6½", and a depth "D" of 13¼". Therefore, the girth of such a box is 39½"—viz., 2 ("H"=6½"+"D"=13¼"); and, consequently, the length "L" of 55" plus the girth of 39.5" results in a total measurement of 94.5"; or, 10.5" more than the maximum permissible measurement for a UPS package capable of being shipped at its actual weight of approximately four pounds. Moreover, the box occupies 2.74 cubic feet of storage space, both in shipment and at the distributors' warehouse, as well as at the retailers' storage facilities. As indicated, such figures are representative of the smallest commercially available one-piece visor model of the type shown at 20 in FIGS. 1-3.

Visors such as those shown 20 in FIGS. 1-3 may be made of a wide range of materials ranging from steel or other sheet metal, to fiberglass, to synthetic plastic materials. Most commonly, however, the visors 20 are formed of synthetic plastic materials in a conventional vacuum molding process. However, this process presents severe limitations in terms of the ability to draw plastic material into grooves or the like to form integral support ribs; although the process readily permits drawing the plastic material into the compound shapes indicated at 26, 28 at the visor extremities or into the central scoop 29. As a consequence, a visor such as that indicated at 20 will typically exhibit front edge "flutter" under conditions of normal usage ranging from about $\frac{1}{8}''$ to about $\frac{7}{8}''$ dependent upon the actual configuration of the visor and the wind conditions to which it is subjected. This resiliency or "flutter" is tolerable under virtually all operating conditions since the plastic material in the region of the flared trailing edge 25 where the visor 20 is riveted to the vehicle body structure 21 acts as a "living hinge" which can readily withstand rapid repetitive flexure. However, when used in conjunction with a conventional bug deflector, again under normal driving conditions, such visors commonly exhibit front edge "flutter" ranging from 1.5″ to 3″, an intolerable condition which rapidly exceeds the fatigue capability of the visor, resulting in the visor 20 tearing loose from the vehicle 21, thus destroying the visor and often damaging the vehicle. The inability to vacuum draw meaningful support ribs, and the expense associated with injection molding techniques and/or the use of increased thickness materials or the like has effectively precluded use of such visors with bug deflectors. Moreover, the per unit shipping costs are prohibitively high with such conventional one-piece visors; and, the visors often must be shipped to remote locations if the manufacturer wishes to provide chrome plated visors in his production line, thereby incurring all of the shipping expenses associated therewith.

Figure 4:
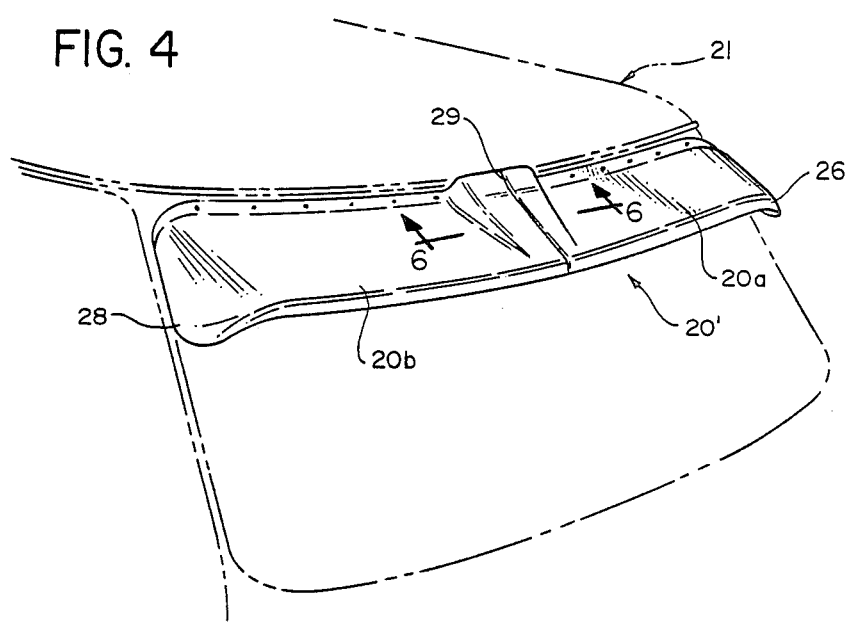
FIG. 4 is a perspectivew view similar to FIG. 1, but here depicting a visor embodying the features of the present invention mounted on a vehicle.

In accordance with one of the important aspects of the present invention, provision is made for overcoming all of the foregoing disadvantages inherent with exterior automotive visors of the exemplary one-piece type shown at 20 in FIGS. 1-3 without incurring needless expense; yet, wherein the resulting visor is virtually indistinguishable from the conventional visor 20 in terms of its outward appearance, is significantly strengthened so as to minimize front edge "flutter" even when used with conventional bug deflectors, requires only about one half the cubic storage space of conventional visors, and where the length "L" plus the girth—viz., 2 ("H"+"D")—does not exceed 84″ even with the largest visor models conventionally used today. To accomplish this, and as best illustrated by reference to FIGS. 4-6 conjointly, a visor 20″ is preferably constructed of a first visor section 20a and second visor section 20b which are adapted to be abutted in end-to-end relation as shown in FIG. 4 to form an overall exterior visor 20′ identical in appearance to that shown in FIG. 1 except that it is made of two pieces which may be readily vacuum formed. Thus, the outer ends or extremities 26, 28 of the respective visor sections 20a, 20b are identical in shape and appearance to the extremities 26, 28 shown in FIG. 1, as is the outward appearance of air scoop 29. However, in this instance, and as best shown by reference to FIGS. 5 and 6 conjointly, the inboard edges of the two sections 20a, 20b are respectively formed with downwardly depending, vertically oriented, fore/aft flanges 32, 34 which are adapted to be placed in face-to-face abutting relation, sandwiched between a pair of steel (or similar rigid material) reinforcing plates 35, 36, and rigidly secured together with "pop" rivets 38 or the like. Thus, the flanges 32, 34, together with the sandwiching plates 35, 36 riveted thereto, define a rigid fore/aft brace or support at the juncture of the visor sections 20a, 20b which effectively strengthens the visor and minimizes front edge "flutter". The flanges 32, 34, being located at the inboard extremities of the respective visor sections 20a, 20b, readily permit of formation even by conventional vacuum forming techniques. Moreover, when the sections 20a, 20b are assembled together as shown in FIG. 4, the support rib or brace thus formed is effectively concealed from view and does not, therefore, detract from the aesthetic appearance of the visor.

Figure 5:
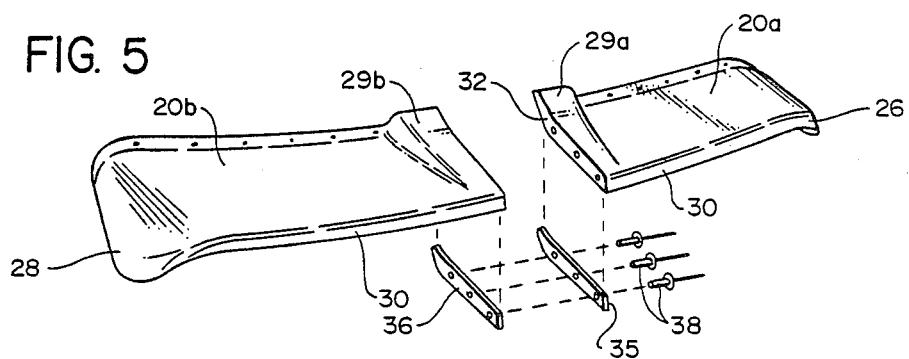
FIG. 5 is an exploded perspective view of the visor shown in FIG. 4, here illustrating its component parts.
Figure 6:
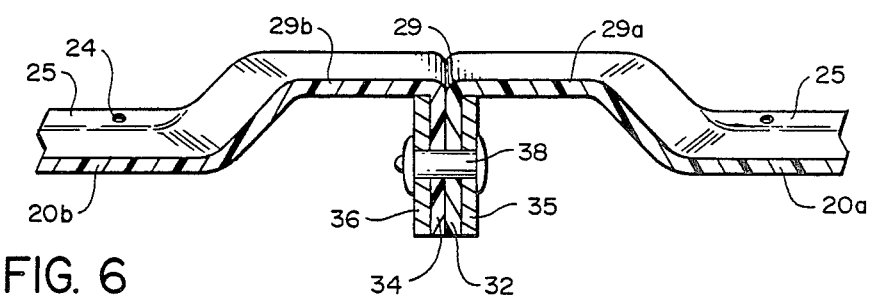
FIG. 6 is a vertical sectional view taken substantially along the line 6—6 in FIG. 4 and depicting details of the visor of the present invention.

In the exemplary visor 20′ shown in FIGS. 4-6, it will be observed that the air scoop 29′ is actually formed in two symmetrical sections 29a, 29b at the inboard ends of respective ones of the visor sections 20a, 20b. The resulting scoop 29′ still serves its intended function of relieving pressure buildup and contributing to the overall strength and rigidity of the visor 20′. However, those skilled in the art will readily appreciate that the scoop 29′ is not an essential feature of the invention—albeit that it contributes to the overall heighth of the flanges 32, 34—and it can be dispensed with and replaced with louvers (not shown) and/or two or more scoops spaced outboard of the abutting flanges 32, 34.

The arrangement readily permits of fabrication of the visor sections 20a, 20b from virtually any desired material ranging from synthetic plastics, to fiberglass, to sheet metals such as steel. Because the sections 20a, 20b are relatively short—the longest current version being on the order of less than 36″ in length "L"—the sections can be chrome plated at many commercially available plating facilities throughout the world. In short, it is no longer necessary to ship the visors to remote plating facilities capable of plating objects up to 70″ or more in length.

Figure 7:
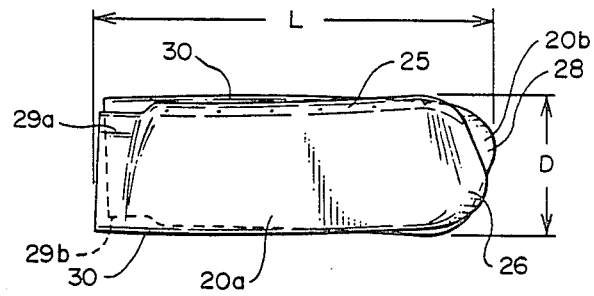
FIG. 7 is a plan view similar to FIG. 2, but here depicting the two visor sections of a visor embodying the features of the present invention nested in stacked relationship one upon the other.
Figure 8:
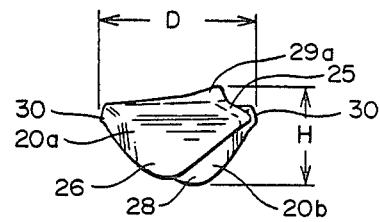
FIG. 8 is an end view illustrating the two nested visor sections shown in FIG. 7; and, FIG. 9 is a perspective view depicting the packaging of an exterior automotive vehicle visor made in accordance with the present invention.
Figure 9:
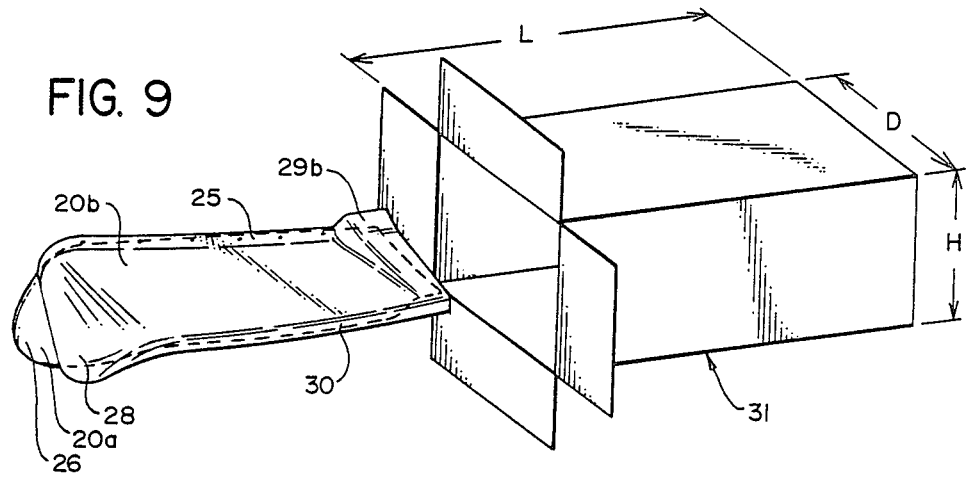

Turning next to FIGS. 7-9, the advantages of the present invention vis-a-vis the storability and transportability characteristics of visors will be readily apparent. Thus, as here illustrated, it will be noted that when the two essentially symmetrical visor sections 20a, 20b are stacked in nested relation, they occupy a cubic volume of space having outside dimensions which do not exceed a length "L", a heighth "H", and a depth "D" where "L", "H" and "D", for even the largest commercially available exterior automotive visor, are on the order of slightly less than: "L"=$35\frac{3}{4}''$; "H"=$6\frac{1}{2}''$; and, "D"=$12\frac{1}{4}''$—this despite the fact that the two visor sections 20a, 20b, when assembled as shown in FIG. 4, define an exterior automotive visor 20″ having an overall length "L" of on the order of $71\frac{1}{2}''$. As a consequence of this arrangement, the nested sections 20a, 20b shown in FIGS. 7 and 8 may be packaged in a box 31 as shown in FIG. 9 wherein the outside dimensions of the box are: "L"=$36\frac{1}{4}''$; "H"=$6\frac{3}{4}''$; and "D"=$12\frac{1}{2}''$. Thus, the exemplary box 31 would occupy approximately 1.77 cubic feet of space and have a length plus girth dimension of only 74.75". This is to be contrasted with the comparable dimensions for a one-piece visor such as the visor 20 shown in FIGS. 1-3 having an effective overall length "L" of about 71½", a heighth "H" of about 6¼", and a depth "D" of about 12¼" wherein the box would occupy approximately 3.4 cubic feet of space and would have a length plus girth measurement of approximately 110". As a consequence, visors manufactured in accordance with the present invention may be readily shipped by UPS or other commercial carrier at their actual weight rather than at an arbitrary increased weight attributable simply to the size of the package.

While the present invention has herein been illustrated and described in conjunction with an exemplary visor construction wherein the visor 20' of FIGS. 4–9 is formed of two symmetrical pieces, those skilled in the art will appreciate that in its broader aspects the invention is not so limited. Thus, the two visor sections need not be symmetrical provided only that they meet the desired criteria that: "L"+2 ("H"+"D")≦84". Moreover, the visor could be made in n sections where n is any desired whole integer. For example, where n=3, the visor would be formed of three visor sections, thereby further reducing the length of the packaged visor so as to further reduce the cubic volume of the box and, at the same time, providing two strengthening ribs at the junctures of the three end-to-end sections when assembled.

Visors made in accordance with the present invention have been tested under adverse conditions with vehicles having bug deflectors and on those particular vehicles known to possess the least favorable characteristics in terms of visor front edge "flutter". Under such conditions, even when the vehicle was driven at rates of speed significantly higher than normally permitted and/or attained in highway traffic, the visor exhibited front edge "flutter" of less than ⅛"—a tolerable condition heretofore attainable only when no bug deflector was used and/or when the visor was made of heavy massive material at significant cost and denigration of the visor's aesthetic appearance.

Those skilled in the art will appreciate that there has herein been disclosed a simple, yet highly effective, visor construction which overcomes virtually all of the problems that heretofore plagued the industry. Thus, the respective visor sections, when assembled, produce a visor that is stronger than a conventional one-piece visor while presenting the same pleasing outward appearance. When disassembled, the visor sections are of such a size as to readily permit of chrome plating at commercially available plating facilities located in virtually all geographic regions, thus significantly reducing the costs of shipment of the visor to and from such plating facilities. And, when disassembled and packaged, the visors occupy only one half the space of conventional one-piece visors, thereby facilitating warehousing and stocking of a large number of different visor models; and, at the same time, permitting shipment of individual visors to fill "special order" requirements at the actual packaged visor weight rather than at an arbitrary higher weight to compensate for the oversized box required for one-piece visors.

What is claimed is:

1. An exterior visor for automotive vehicles comprising, in combination:
    (a) a first visor section having inboard and outboard edges and including means for securing said first visor section to a vehicle in a position overlying the vehicle windshield on the driver's side thereof;
    (b) a second visor section, independent of said first visor section, having inboard and outboard edges and including means for securing said second visor section to a vehicle in a position overlying the vehicle's windshield on the passenger's side thereof;
    (c) said inboard edge of each of said first and second visor sections terminating in a downwardly extending vertical flange; and,
    (d) means for securing said downwardly extending vertical flange on said first visor section to said downwardly extending flange on said second visor section in face-to-face relation so as to form an exterior visor for automotive vehicles spanning the width of the vehicle in overlying relation to the vehicle windshield and having an integral, rigid support brace defined by said flanges located intermediate the opposite outboard edges of said first and second visor sections.

2. An exterior visor for automotive vehicles comprising, in combination:
    (a) a first visor section having first and second lateral edges adapted to extend in a fore/aft direction when mounted on a vehicle and including means for securing said first visor section to a vehicle in a position overlying a portion only of the vehicle windshield;
    (b) n second visor section(s) where "n" is a whole integer, said n second visor section(s) being independent of said first visor section, having first and second lateral edges adapted to extend in a fore/aft direction when mounted on a vehicle, and including means for securing said n second visor section(s) to a vehicle in a position overlying the remaining portion of the vehicle windshield;
    (c) said first visor section and said n second visor section(s) adapted to be placed together in abutting end-to-end relation with the first lateral edge of one of said visor sections abutting the second lateral edge of the adjacent one of said visor sections so as to form an exterior visor having 1+n visor sections;
    (d) said abutting first and second lateral edges of each of said first visor section and said n second visor section(s) terminating in a downwardly extending vertical flange; and,
    (e) means for securing said downwardly extending vertical flange on each of said abutting first and n second visor sections together in face-to-face relation so as to form an exterior visor for automotive vehicles spanning the width of the vehicle in overlying relation to the vehicle windshield and having n integral, rigid support brace(s) defined by said flanges on said abutting first and second edges with said n support brace(s) located intermediate the outboard extremities of said exterior visor.

3. An exterior visor for automotive vehicles as set forth in claim 1 further characterized in that said first and second visor sections are symmetrical in shape and respectively define the left and right halves of the overall exterior visor when assembled in end-to-end relation.

4. An exterior visor for automotive vehicles as set forth in claims 1, 2 or 3 further characterized in that said first and second visor sections, when unassembled, are capable of being stacked in nested relation occupying a cubic volume of space having a length "L", a heighth "H" and a depth "D" wherein the dimensions "L", "H" and "D" are such that the length "L" plus twice the sum of the height "H" and the depth "D" does not exceed 84".

5. An exterior visor for autmotive vehicles as set forth in claims 1, 2 or 3 wherein said first and second visor sections are formed of synthetic plastic material.

6. An exterior visor for automotive vehicles as set forth in claim 5 wherein said first and second visor sections are formed in a vacuum molding operation.

7. An exterior visor for automotive vehicle as set forth in claims 1, 2 or 3 wherein said first and second visor sections are formed of synthetic plastic material and are chrome plated.

8. An exterior visor for automotive vehicles as set forth in claims 1, 2 or 3 wherein said first and second visor sections are formed of fiberglass.

9. An exterior visor for automotive vehicles as set forth in claims 1, 2 or 3 wherein said first and second visor sections are formed of fiberglass and are chrome plated.

10. An exterior visor for automotive vehicles as set forth in claims 1, 2 or 3 wherein said first and second visor sections are formed of metal.

11. An exterior visor for automotive vehicles as set forth in claims 1, 2 or 3 wherein the trailing edge of said exterior visor is adapted to be spaced from the vehicle roof line and said visor is a flow-through visor.

12. An exterior visor for automotive vehicles as set forth in claims 1, 2 or 3 wherein the trailing edge of said visor is adapted to be flush-mounted to the vehicle immediately above the upper edge of the windshield.

13. An exterior visor for automotive vehicles as set forth in claims 1, 2 or 3 wherein at least one of said first and second visor sections is shaped so that when said first and second visor sections are secured together in end-to-end relation, said exterior visor is provided with an upwardly and rearwardly projecting scoop for permitting passage of air beneath the visor, through the scoop, and over the vehicle roof line.

14. An exterior visor for automotive vehicles comprising, in combination:
(a) a first visor section having inboard and outboard edges and including means for securing said first visor section to a vehicle in a position overlying the vehicle windshield on the driver's side thereof;
(b) a second visor section, independent of said first visor section, having inboard and outboard edges and including means for securing said second visor section to a vehicle in a position overlying the vehicle's windshield on the passenger side thereof;
(c) said first and second visor sections each including:
(i) a rearwardly opening, upwardly projecting scoop defining portion flaring upwardly out of the plane of the visor section from the leading edge thereof; and (ii) a downwardly extending fore/aft vertical flange adjacent the inboard edge of the visor section; and,
(d) means for securing and downwardly extending flange on said first visor section to said downwardly extending flange on said second visor section in face-to-face relation with one another so as to form an exterior visor for automotive vehicles spanning the width of the vehicle in overlying relation to the vehicle windshield and having a rearwardly opening scoop flaring upwardly out of the plane of the exterior visor from the leading edge thereof and an integral, rigid support brace defined by said flanges bisecting said scoop in the fore/aft direction.

15. An exterior visor for automotive vehicles as set forth in claim 14 wherein the outboard edges of said first and second visor sections are curved outwardly and downwardly out of the plane of said visor sections so as to wrap around the outermost upper extremities of the windshield.

16. An exterior visor for automotive vehicles as set forth in claims 14 or 15 further characterised in that said first and second visor sections are symmetrical in shape and respectively define the left and right halves of the overall exterior visor when assembled in end-to-end relation.

17. An exterior visor for automotive vehicles as set forth in claims 14 or 15 further characterised in that said first and second visor sections, when unassembled, are capable of being stacked in nested relation occupying a cubic volume of space having a length "L", a heighth "H" and a depth "D" wherein the dimensions "L", "H" and "D" are such that the length "L" plus twice the sum of the heighth "H" and the depth "D" does not exceed 84".

18. An exterior visor for automotive vehicles as set forth in claim 16 further characterised in that said first and second visor sections, when unassembled, are capable of being stacked in nested relation occupying a cubic volume of space having a length "L", a heighth "H" and a depth "D" wherein the dimensions "L", "H" and "D" are such that the length "L" plus twice the sum of the heighth "H" and the depth "D" does not exceed 84".

* * * * *